United States Patent [19]

Raines

[11] 4,418,807
[45] Dec. 6, 1983

[54] FRICTION INTERFACE UNIT FOR A CLUTCH AND A BRAKE

[75] Inventor: Charles D. Raines, Bethel, Minn.

[73] Assignee: Horton Industries, Inc., Minneapolis, Minn.

[21] Appl. No.: 262,407

[22] Filed: May 11, 1981

[51] Int. Cl.³ .............................................. B60K 41/24
[52] U.S. Cl. .............................. 192/18 A; 192/85 AA
[58] Field of Search ................ 192/70.28, 66, 85 AA, 192/12 C, 17 A, 18 A

[56] References Cited

U.S. PATENT DOCUMENTS

| 2,586,617 | 2/1952 | Danly | 192/17 A |
| 2,753,031 | 7/1956 | Light | 192/12 R |
| 2,905,290 | 9/1959 | Munschauer | 192/12 C |
| 2,909,255 | 10/1959 | Chung | 192/18 A |
| 3,077,252 | 2/1963 | Treer | 192/18 A |
| 3,199,646 | 8/1965 | McBride | 192/85 AA |
| 3,468,402 | 9/1969 | Edwards | 192/18 A |
| 3,500,970 | 3/1970 | Schilling | |
| 3,526,302 | 9/1970 | Grant et al. | |
| 3,527,329 | 9/1970 | Jordan | |
| 3,744,608 | 7/1973 | Newman | 192/18 A |
| 4,071,940 | 2/1978 | Hazelton | 192/18 A |
| 4,226,311 | 10/1980 | Johnson et al. | |

FOREIGN PATENT DOCUMENTS

| 68084 | 5/1968 | Australia . |
| 1575251 | 10/1969 | Fed. Rep. of Germany . |
| 1551796 | 11/1968 | France . |
| 2393191 | 12/1978 | France . |
| 534220 | 3/1941 | United Kingdom . |
| 646128 | 11/1950 | United Kingdom . |
| 737774 | 9/1955 | United Kingdom . |

Primary Examiner—George H. Krizmanich
Attorney, Agent, or Firm—Wicks & Nemer

[57] ABSTRACT

A friction interface unit is shown according to the teachings of the present invention for use with a clutch, a brake, or a clutch-brake. The unit includes a hub having an annular friction flange and adapted to receive a shaft. A first housing portion is rotatably supported by a pair of bearings interposed between and in radial alignment with the hub and the first housing portion. The first housing portion is adapted to be associated with a sheave, an anchor mount for a brake, or a ring disc for a caliper brake. A second housing portion is further provided which has a central circular portion and which is bolted to the first housing portion thereby forming a full housing. Also included is a piston having an annular flange extended over said central circular portion to form a cylinder with a single O-ring. The second housing portion has a rotary air union mounted thereon for introducing fluid pressure into the cylinder to activate the piston to cause a friction facing mounted thereon to engage the friction flange for rotation of the hub. In operation, i.e., engagement, the entire unit rotates and when rotating there is no relative motion between the races of the bearings thus measurably increasing bearing life.

5 Claims, 6 Drawing Figures 4,418,807

FRICTION INTERFACE UNIT FOR A CLUTCH AND A BRAKE

SUMMARY

The invention relates to an improvement in clutches and brakes and more particularly in the flexibility of application, simplicity of construction and in the compactness of envelope size efficiency.

It is therefore an object of the invention to provide a friction interface unit which is compact and useable with a clutch, a brake, or a clutch-brake. It is a further object to provide such a unit which requires no change thereof other than the addition of an accessory to provide a clutch, a brake or a clutch-brake.

It is an object of the invention to provide a friction interface unit having a first housing portion including a cylindrical hollow base portion which mounts the accessory for a clutch, a brake or a clutch-brake and such mounting is positioned axially to insure dynamic forces to center substantially over the support bearings in the case of a clutch, a brake or a clutch-brake, the multi-purpose bearings being mounted within the hollow base portion. The first housing portion connects to a second housing portion which contains an annular piston axially mounted on a central circular portion of the second housing with a single O-ring making sealing engagement of the piston and the central circular portion. The design allowing the single O-ring allows a through bore for a shaft on the friction drive flange rather than a blind bore or an end cap. The piston has a friction facing engageable with a friction flange mounted on a hub keyed to a shaft to be either braked or clutched in.

The invention will appear more clearly from the following detailed description when taken in connection with the accompanying drawings, showing by way of example preferred embodiments of the inventive idea wherein like numerals refer to like parts throughout.

In the drawings forming part of this application:

Figure 1:
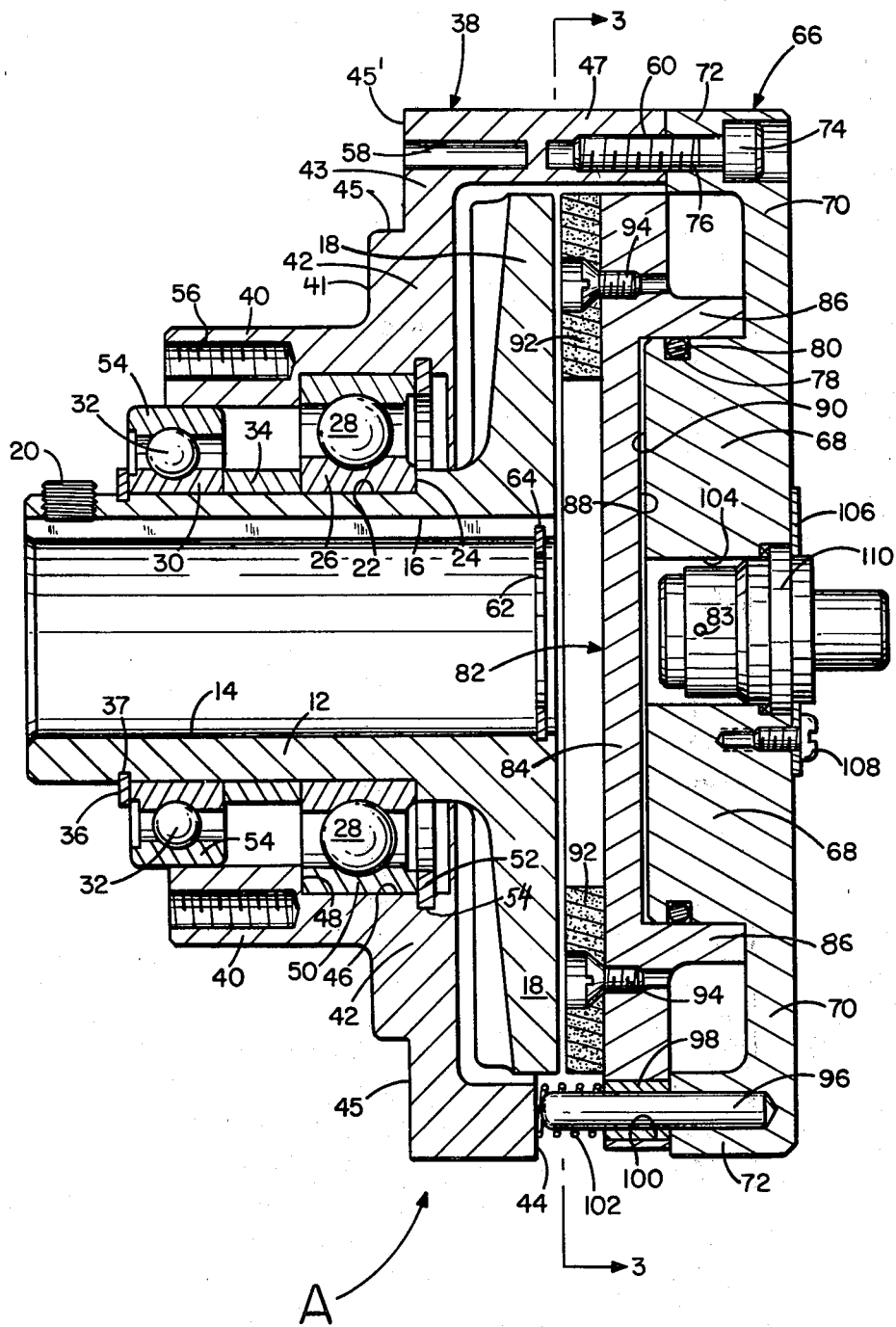
FIG. 1 is a sectional view on the line 1—1 of FIG. 2 of a friction interface unit for use with a clutch, a brake or a clutch-brake and embodying the invention.
Figure 2:
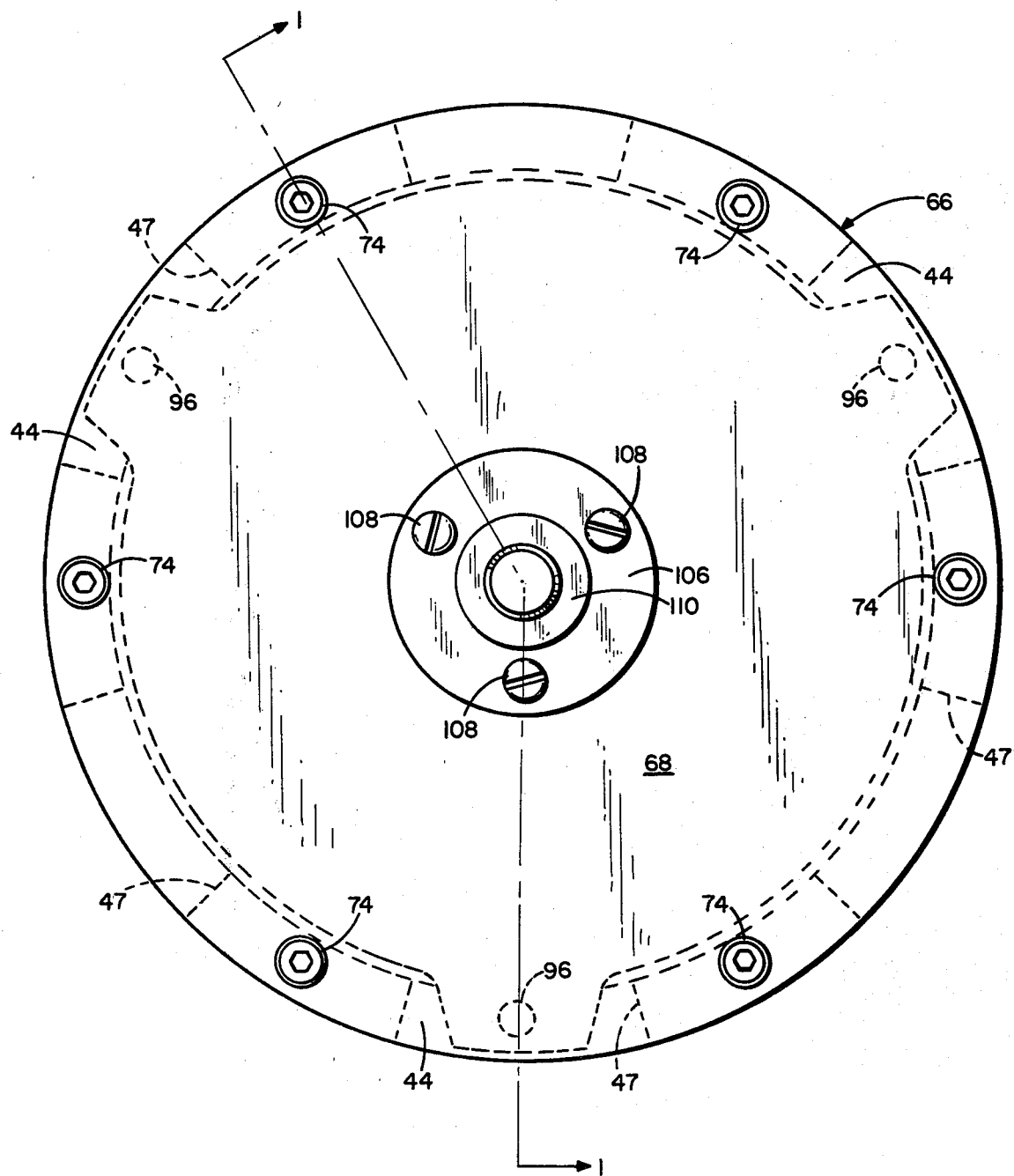
FIG. 2 is an elevational face view of the unit of FIG. 1.
Figure 3:
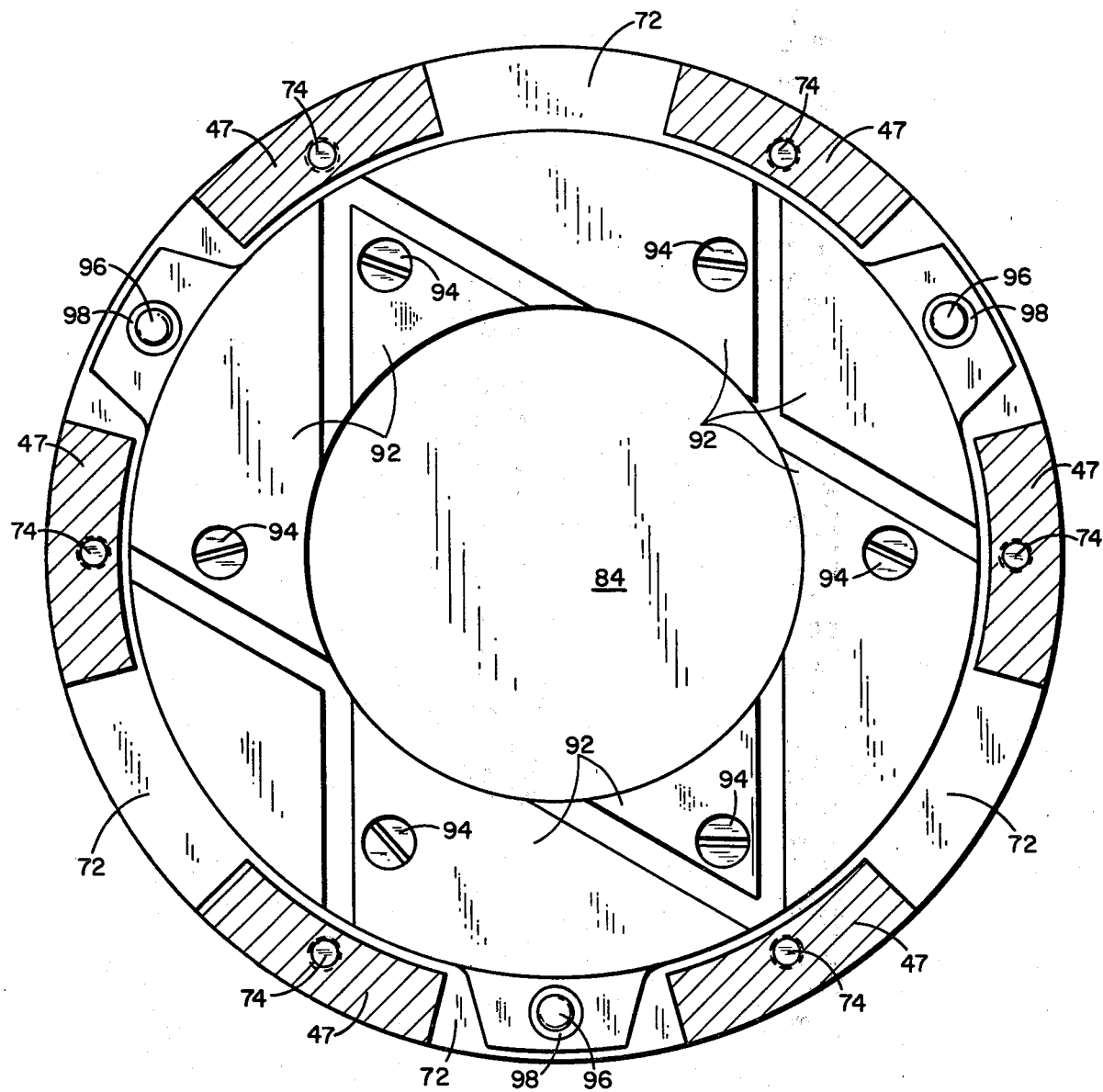
FIG. 3 is a sectional view on the line 3—3 of FIG. 1.

Referring to the drawings in detail, the friction interface unit A includes the hub 12 in which is formed the axial bore 14. The bore has formed therein the keyway 16. Extending radially outwardly from the inner end of the hub is the annular friction flange 18. The hub 12 has mounted thereon the set screw 20 for engagement of a shaft, not shown. Additionally, the hub 12 has formed thereon the annular recess 22 which forms the annular shoulder 24. Positioned on the hub and in the recess 22 in abutment with the shoulder 24 in the inner race 26 of a first bearing 28. Also positioned in the recess 22 is the inner race 30 of a second bearing 32. Positioned between the races of the bearings is the annular spacer 34 and the bearings are held in position by means of the key ring 36 engaged in a recess 37 formed in the hub 12.

The numeral 38 designates a first housing portion of the unit which includes the cylindrical hollow base portion 40 on which a sheave may be mounted for clutch operations hereinafter set forth and from which extends the right angularly and radially disposed annular wall portion 42 which forms the radially extending shoulder 41. The wall portion 42 terminates radially outwardly in the offset annular and radially disposed flange portion 43 thereby forming the axially extending annular shoulder 45 on which a ring disc member is mounted as hereinafter set forth and the ring disc is in abutment with the radially extending shoulder 45. The diameter of the shoulder 45 being substantially that of the disc ring hereinafter referred to. It will be seen that the bearings support a sheave and/or a ring disc member. The flange portion 43 terminates radially outwardly in the continuous right angular flange portion 44 from which extends spaced flanges 47. The annular base portion 40 of housing 38 has formed therein internal recess 46 which forms the annular shoulder 48. Positioned in the recess and in abutment with the shoulder 48 is the outer race 50 of the first bearing 28 and the race is held in abutment with the shoulder 48 by means of the retainer snap ring 52 in an annular recess 54 formed in the surface of the recess 46.

The bearing 32 also includes the outer race 54 fitted within the hollow cylindrical base portion 40, thereby radially supporting the cylindrical base portion 40 at the outer end. Extending axially into the base portion 40 are a series of spaced threaded holes 56 and extending axially into the annular flange portion 44 are a series of spaced threaded holes 58 and opposed spaced threaded holes 60. The numberal 62 designates a retainer snap ring fit into an annular recess 64 formed in the inner surface of the bore 14 of hub 12 which provides a stop for the end of a shaft positioned in the bore 14 and a containment for a key in keyway 16.

The numeral 66 designates a second housing portion which includes the central circular portion 68 which terminates at a portion of its outer periphery in the annular flange portion 70 which in turn terminates in the right angular annular flange portion 72 which abuts the annular flange portion 44 of first housing portion 38. The second housing portion 66 is secured to the first housing portion 38 by means of a series of spaced bolts 74 each extending through a hole 76 formed through the flange portion 72 and in threaded engagement with a threaded hole 60 thereby making a surrounding enclosure housing.

Formed on the outer periphery of the central circular portion 68 of the second housing portion 66 is the recess 78 in which is positioned the O-ring 80. The numeral 82 designates a circular piston formed of the circular portion 84 which has extending therefrom the annular right angle flange portion 86 which is mounted on and overlapping the circular portion 68 of the second housing portion 66 and in sealing contact with the O-ring 80.

The outer edge of the flange portion 86 abuts the inner surface of the flange portion 70 to such an extent that the face surface 88 of the piston 82 is spaced slightly from the inner face surface 90 of the circular portion 68 of second housing portion 66 to form a cylinder void when the unit is inoperative. Secured to the outer face of the piston 82 at the outer portion thereof is the friction ring 92 by means of the spaced bolts 94. With the unit A activated as hereinafter described the friction ring 92 is caused to engage the friction flange 18.

Further provided are a series of spaced torque pins 96 each of which is mounted at one end in the annular flange portion 72 of the second housing portion 66. Each of the pins 96 extends freely through a bronze bushing 98 mounted in a hole 100 formed adjacent the outer periphery of the circular portion 84 of the piston 82. A coil spring 102 is mounted on each of the pins 96 in abutment with the continuous flange portion 44 and a portion of the circular piston portion 84 thereby normally urging the friction ring 92 on the piston from the annular friction flange 18.

The numeral 104 designates an axial hole formed in the central circular portion 68 of the second housing portion 66 and secured within the hole 104 by means of the circular plate 106 and bolts 108 is the conventional rotary air union 110 by means of which air pressure is introduced into the cylinder void between the piston 82 and the circular portion 68 via hole 83 to cause the friction ring 92 to engage the friction flange 18 against the action of the springs 102.

Figure 4:
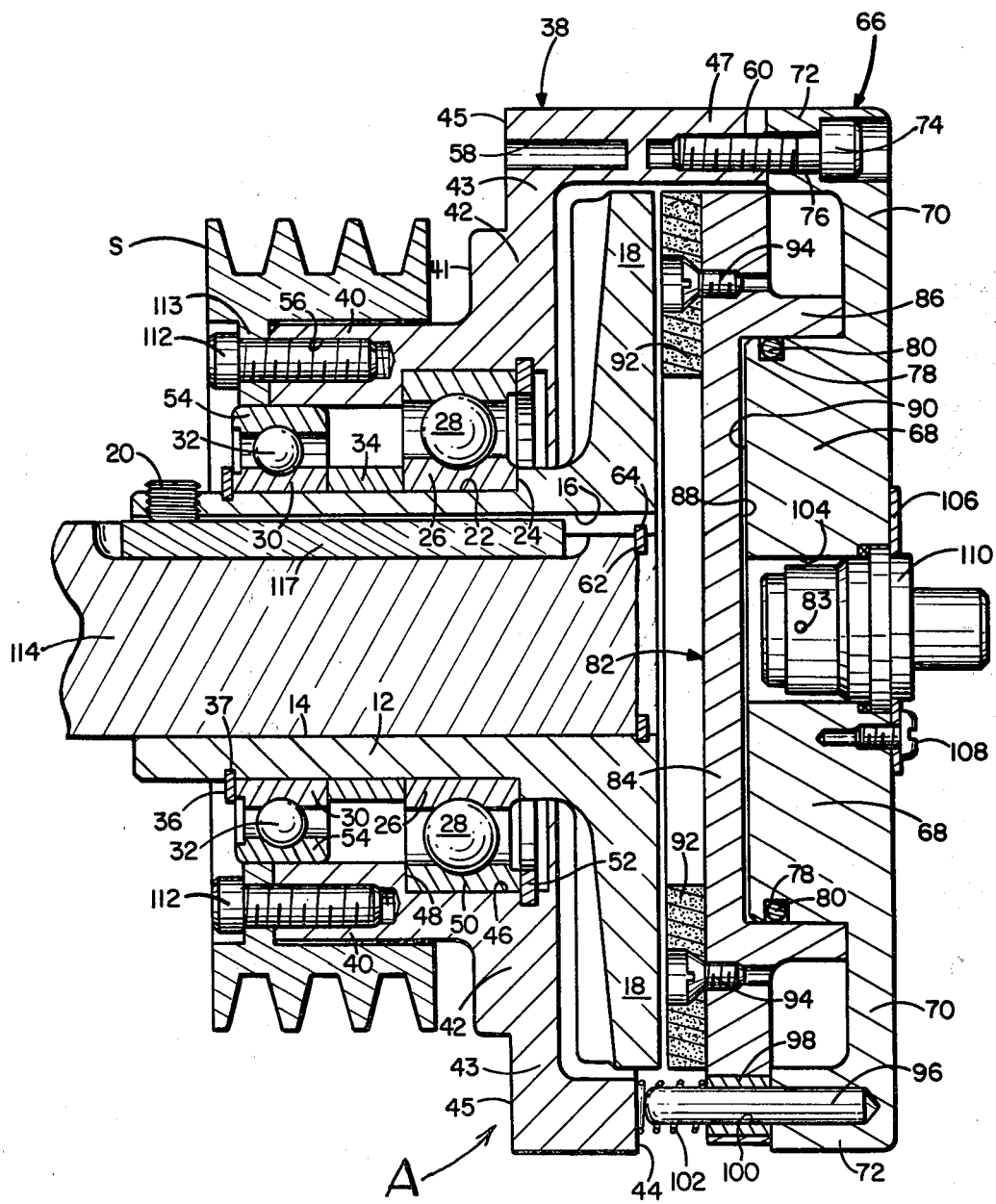
FIG. 4 is a sectional view of the unit adapted as a clutch.

In FIG. 4 is illustrated the unit A used with and forming a clutch and including the sheave S which is simply and easily mounted on the cylindrical base portion 40 of the first housing portion 38. The construction places the sheave in radial alignment with the bearings 28 and 32. The sheave is secured by a series of spaced bolts 112 each extending through a flange 113 of the sheave S and into a threaded hole 56. A shaft 114 is shown the end of which is positioned in the bore 14 with the end of the shaft in alignment abutment with the ring 62 and with the set screw 20 in engagement with the key 117 of the shaft.

As to the operation of the clutch of FIG. 4, let it be assumed that the sheave S is driven by a series of V-belts and as a result, the housing portions 38 and 66 rotate with the sheave and likewise the piston 82. When it is desired to clutch in and rotate the shaft 114, air pressure is introduced via the rotary air union 110 and against the face 88 of piston 82. As a result of the above, the friction ring 92 engages the friction flange 18 to which the shaft 114 is keyed whereby the shaft is rotated.

Let it be further assumed that the shaft 114 is a driver and is driven as a shaft of a motor and the sheave S is to be driven. The friction flange 18 is part of the hub 12 keyed to the shaft 114. To clutch in and drive the sheave S air pressure is introduced via the rotary air union and against the face 88 of piston 82. As a result of the above, the friction ring 92 engages the friction flange 18, and inasmuch as the piston is connected to the second housing portion 66 which is connected to the first housing portion 38, the sheave S is rotated for it is connected to the first housing portion.

Figure 5:
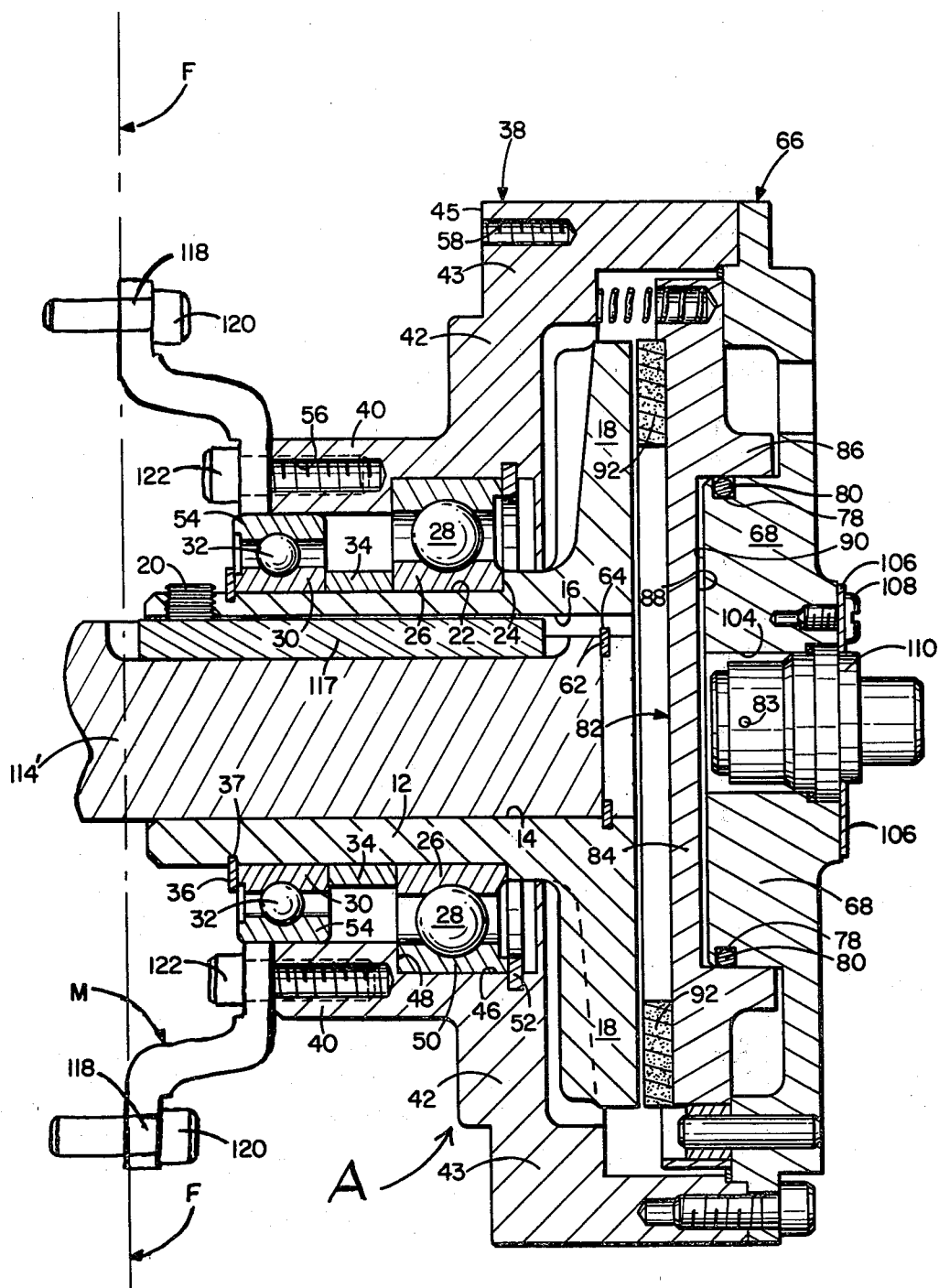
FIG. 5 is a sectional view of the unit adapted as a brake.

In FIG. 5 is illustrated the unit A used with and forming a brake and including the anchor mount M which has the flanges 118 secured by bolts 120 to a stationary member such as a motor frame F. The mount M is also secured to the annular base portion 40 of the first housing portion 38 by means of spaced bolts 122 in spaced threaded holes 56 whereby the first housing portion 38 is held stationary as is the second housing portion 66 connected thereto.

A rotating shaft 114 to be braked has the end thereof positioned in the bore 14 of the hub 12 mounting the friction flange 18 with the end of the shaft in alignment and abutment with the ring 62 and with the set screw 20 in engagement with the key 117 of the shaft. The hub 12 rotates within the annular base portion 40 of the housing portion 38 by means of bearings 28 and 32.

As to the operation of the brake of FIG. 5, let it be assumed that it is desired to brake a rotating shaft 114'. Air pressure is introduced via the rotary air union 110 and against the face 88 of piston 82 and as a result, the friction ring 92 is caused to engage the friction flange 18 to which the shaft 114 is connected thereby braking the shaft inasmuch as the friction ring 92 is stationary.

Figure 6:
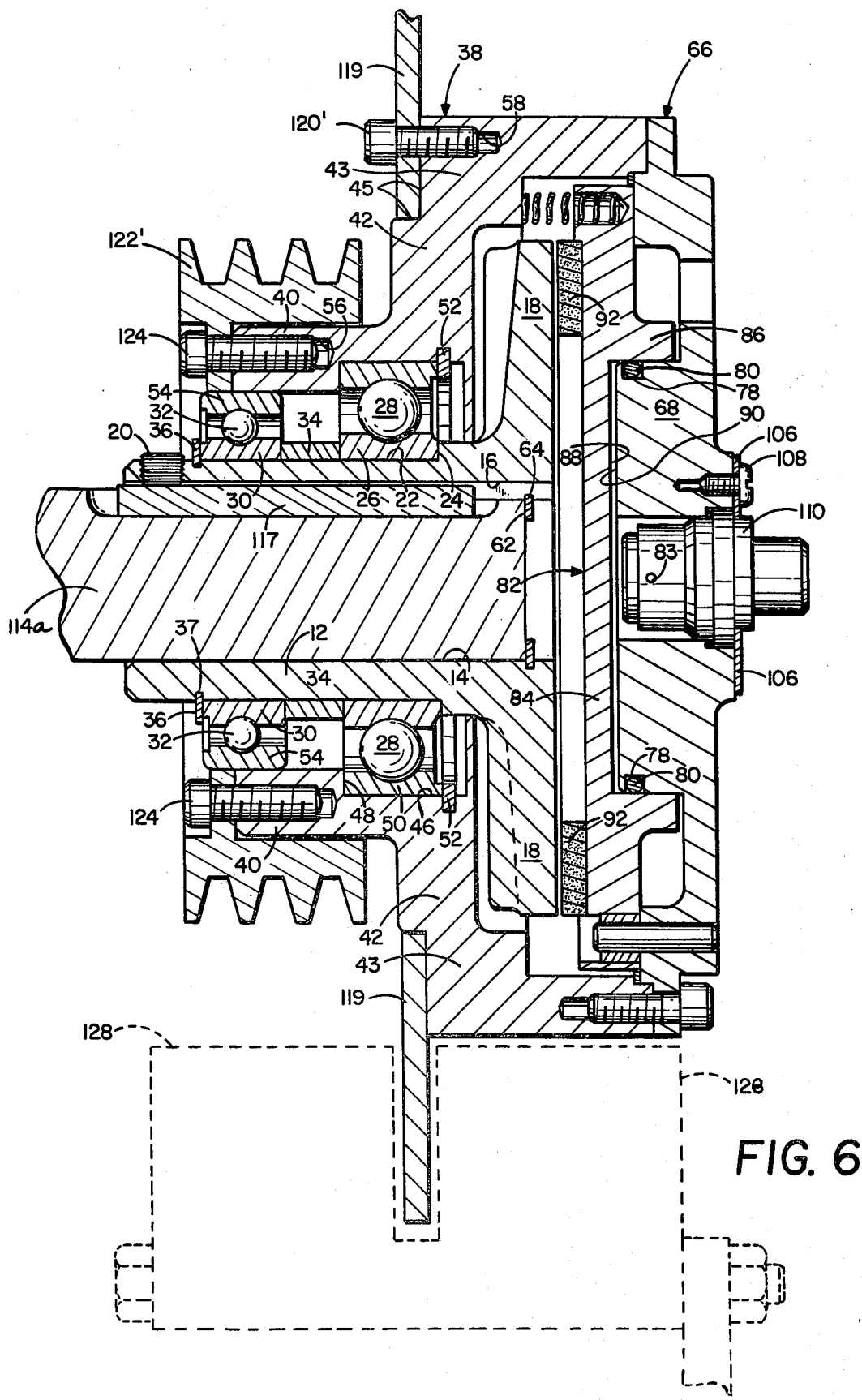
FIG. 6 is a sectional view of the unit adapted as a clutch-brake.

In FIG. 6 is illustrated the unit A used with and forming a clutch-caliper brake for a live shaft such as that of an electric motor and including a ring disc member 119 a portion of which is broken away and it is mounted on the shoulder 45 and against the shoulder 45' of the flange portion 43 and secured by spaced bolts 120' in threaded holes 58. It will be noted that due to the construction of the unit A, the ring disc member 119 is substantially over one of the bearings 28 thereby providing stability of the ring 119.

Mounted on the cylindrical hollow base portion 40 is the sheave 122' which is secured by the spaced bolts 124 in the threaded holes 56. The numeral 114a designates a shaft with the end thereof positioned in the bore 14 and in abutment with the ring 62 with the set screw 20 in engagement with the key 117 of the shaft.

Illustrated diagramatically and in broken lines is a conventional stationary caliper gripping device 128 which is adapted to engage the ring disc 119 by conventional means not shown.

In the operation of the clutch-brake of FIG. 6 let it be assumed that the live shaft 114a and flange 18 are rotating. Air pressure is introduced into the cylinder void as previously described whereby the friction facing 92 of the piston 82 is clutched in and caused to engage the friction flange 18. As a result, the housing portions 38 and 66, the disc 119 and the sheave 122' all rotate in unison. Power from the sheave is belted on to a machine to be driven, not shown.

When it is desired to brake the machine driven, air pressure is exhausted from the cylinder by conventional air valving means and the caliper gripping device 128 is caused to engage the ring disc 119 thereby stopping the housing portions 38 and 66, disc 119 and sheave 122 whereby the machine belted to the sheave is braked.

Having thus described the invention, what is claimed as new and desired to be secured by Letters Patent is:

1. A friction interface unit for use with a clutch, a brake or a clutch-brake, comprising:
   (a) a hub adapted to receive a shaft,
   (b) said hub having an annular friction flange extending radially therefrom;
   (c) a first housing portion including a cylindrical hollow base portion,
   (d) bearing means interposed between and in radial alignment with said hub and said hollow base portion of said first housing portion,
   (e) said hollow base portion having means for mounting a sheave thereon in radial alignment with said hub and said bearing means with the unit as a clutch or a clutch-brake or for mounting on an anchor mount with the unit as a brake,
   (f) said hollow base portion terminating in a radially extended annular wall,
   (g) means for mounting a ring disc on said annular wall adapted for engagement of the ring by a caliper brake,
   (h) a second housing portion having a central circular portion terminating at a portion of its periphery in
   (i) an annular flange portion, (j) means for securing the second housing portion to the first housing portion thereby forming a full housing for the unit, (k) an annular piston, (l) means mounting said piston on said circular portion to form a cylinder, (m) a friction ring mounted on said piston opposite to and for engagement with said annular friction flange, (n) said second housing portion having a series of spaced torque pins carried thereby and slideably mounted in said annular piston, (o) said central circular portion having means mounted thereon and in communication with said cylinder for introducing fluid pressure into said cylinder to thereby activate said piston to cause said friction facing thereon to engage said annular friction flange.

2. The device of claim 1, in which said means for mounting a sheave on said hollow base portion in radial alignment with said bearing means for a clutch or a brake includes a series of spaced threaded holes extending axially into said hollow base portion adapted to receive bolts associated with a sheave or an anchor mount for a brake.

3. The device of claim 1, in which said means for mounting a ring disc for a caliper brake on said annular wall of said hollow base portion includes (a) an annular axially extending shoulder terminating in a radially extended annular wall substantially in radial alignment with at least one of said bearings.

4. The device of claim 1, in which said means mounting said piston on said central circular portion includes:

(a) an annular flange formed on said piston positioned on and overlaying said central circular portion of said second housing portion, and (b) an O-ring interposed between said annular flange of said piston and said circular portion of said second housing portion.

5. The device of claim 1 wherein said means for introducing fluid pressure into said cylinder comprises a rotary air union.

* * * * *